June 7, 1960  E. W. ABSOLON  2,939,476
SHUT-OFF VALVES FOR CONTROLLING FLOW OF LIQUID FROM TANKS
Filed April 13, 1954
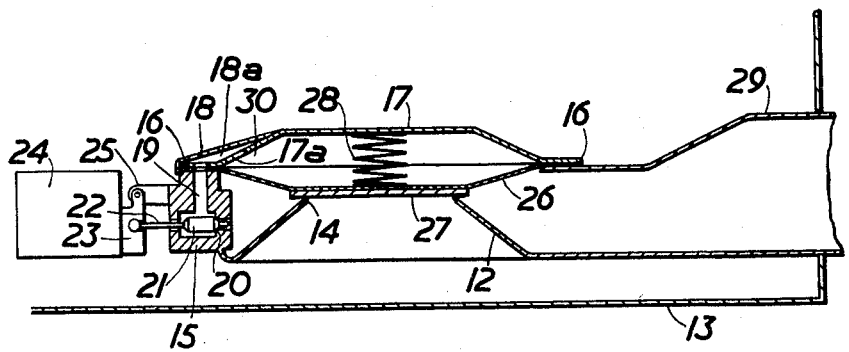
INVENTOR
ERIC WILLIAM ABSOLON
BY *Frederick E. Hane*
ATTORNEY United States Patent Office 2,939,476
Patented June 7, 1960

2,939,476

SHUT-OFF VALVES FOR CONTROLLING FLOW OF LIQUID FROM TANKS

Eric William Absolon, Charlton Kings, Cheltenham, England, assignor to Gloster Aircraft Company Limited, Gloucester, England Filed Apr. 13, 1954, Ser. No. 422,857

4 Claims. (Cl. 137—195)

This invention relates to improvements in shut-off valves and is particularly concerned with devices for controlling the flow from a liquid tank in accordance with the level of the liquid in the tank.

The invention is primarily directed to shut-off valves for pressurised fuel tanks for aircraft. Such tanks are normally supplied with compressed air to ensure the supply from the tanks to the engine at the desired rate of flow. When one tank is emptied, it is important to cut off that tank from the engine, otherwise the air supplied to that tank will pass to the engine inlet with the result that an excessive amount of air will be entrained in the fuel from the remaining tanks. If a conventional float type valve is employed to cut off the tank on emptying, the valve must be very large to overcome the forces resulting from the high rates of flow; further, the valve parts must be machined to fine limits and even then a certain amount of leakage is encountered.

According to the present invention we provide a shut-off valve for a pressurised tank comprising a flow valve for controlling flow of liquid from the tank, a pressure-responsive member forming one wall of an enclosure and arranged so as to be subjected, externally of the enclosure, to the pressure at the outlet side of the flow valve, the flow valve being actuated by the movements of the pressure-responsive member, and a pilot valve controlled by the level of liquid in the tank and arranged to put the enclosure into communication with the outlet side of the flow valve and thereby to permit opening of the flow valve when the liquid level is above a prescribed height and to put the enclosure into communication with the tank so that the pressure therein effects closing of the flow valve when the liquid level falls below the prescribed height.

The invention will be readily understood by way of example from the following description of a shut-off valve for controlling the flow from an aircraft pressurised fuel tank, reference being made to the accompanying drawing which shows the valve in section.

The shut-off valve consists of a frusto-conical funnel member 12 mounted in the fuel tank near to but spaced from the bottom 13 of the tank. The upper and narrower end of member 12 is formed with a circular and horizontal edge forming a valve seat 14 for a flow valve controlling flow of liquid from the tank which is supplied with compressed air to ensure an even flow. A wall 15 surrounds the funnel member 12 which is secured to the wall in liquid tight relation; the top of this wall is slightly above the level of the valve seat 14 and has secured to it the outwardly extending flange 16 of an integral dished cover 17. At one point, the cover 17 is provided with an outer wall 18 forming a local protrusion on the cover and with the cover totally enclosing a space 18a. This space 18a is in communication through an opening 17a with the interior of cover 17 and through a hole in the flange with a passage 19 in the wall 15 leading to a horizontal cavity 20 which has reduced end openings and which forms a cylinder for a valve piston 21. The piston 21 is mounted on a rod 22, the end of which is pivoted in a plate 23 carrying a float 24 and pivoted to a projecting part 25 of wall 15.

A flexible diaphragm 26 is secured with its edge between the top of wall 15 and flange 16 and carries a central valve disc 27 aligned with an adapted to close the valve seat 14. Valve disc 27 while opening in response to the pressure of the pressurized fuel, is urged towards closing position by a light helical spring 28 located between cover 17 and the disc.

The wall 15 is pierced at one point by the outlet roll tube 29 leading to the engine. Thus, on opening of the valve formed by valve seat 14 and valve disc 27, fuel under the pressure of the compressed air can pass from the tank to the engine.

As will be seen from the figure, piston 21 acts as a pilot valve. When it is in its extreme left hand position, it closes the port to the tank and puts into communication through passage 19 the space 30 between cover 17 and diaphragm 26 with the outlet side of the flow valve formed by seat 14 and disc 27. This occurs when the liquid level in the tank is above the bottom of the member 12 and the float 24 is accordingly pivoted upwards to close the port between the tank and the passage 19. As a result, the pressure in space 30 and at the outlet side of the flow valve are the same so that the valve disc 27 can move away from its seat to permit flow of fuel to the engine as required.

When the fuel level in the tank drops to a level approaching the bottom of member 12 either through consumption or owing to rolling of the aircraft, the float 24 takes up the position shown and causes piston 21 to close the opening at the right hand end of cavity 20 and to open that at the left hand end. Space 30 is then at the pressure of the tank and hence the inner side of the diaphragm 26 is at a higher pressure than that at the outer side, there being a pressure drop across the flow valve. Initially assisted by spring 28, valve disc 27 therefore closes on its valve seat, thereby cutting off the fuel supply before the level reaches the bottom of member 12 and before the air under pressure is allowed to pass to the engine.

I claim:

1. In combination with an aircraft pressurized liquid fuel tank having a fuel outlet, a shut off valve disposed within said tank adjacent to the bottom thereof for controlling fluid flow outwardly of said tank through said fuel outlet, a first conduit connecting said valve to said outlet, said valve having walls defining a chamber and an inlet, said inlet being in communication with the interior of said tank, a pressure responsive member within said valve supported in overlying relationship with said inlet for reciprocating movement between open and closed positions therewith controlling the passage of pressure fluid from said tank through said first conduit, a spring biasing said pressure responsive member toward a closed position with said inlet, a pilot valve supported within said tank in predetermined spatial relationship with said shut off valve, said shut-off valve having an interior compartment with a first port at one end in communication with said tank, a second port at an opposite end of said compartment in communication with said first conduit, and a third port intermediate the ends of said compartment in communication with said chamber, a piston slidably supported for reciprocating longitudinal movement within said compartment for movement between closing engagement at opposite ends with each of said first and second ports to control communication of said third port with each of said first and second ports, a liquid level responsive float pivotally carried by said pilot valve above the level of said pressure responsive member for pivotal movement in a vertical direction in response to changes in the liquid level in said tank, said piston being connected to said float for reciprocating longitudinal movement in response to said vertical movement of said float, one end of said piston being maintained by the upward movement of said float in closing engagement with said first port in response to the presence of a liquid level within said tank at least as high as the level of said pressure responsive member to prevent communication between the interior of said tank and said chamber and to provide communication between said first conduit and said chamber through said second port, the opposite end of said piston being maintained by the downward movement of said float in closing engagement with said second port in response to a decline in the liquid level within said tank below the level of said pressure responsive member to prevent communication between said first conduit and said chamber and to provide communication between said tank and said chamber through said second port to allow fluid pressure within said tank to equalize the fluid pressure acting on the opposite sides of said pressure responsive member to permit said spring to secure said pressure responsive member in said closed position with said inlet.

2. The combination according to claim 1, wherein said pressure responsive member is a diaphragm, said diaphragm having an area larger than that of the inlet of the first conduit and being biased toward closing engagement with the inlet of the first conduit.

3. In combination with an aircraft pressurized liquid fuel tank having a fuel outlet, a shut-off valve within said tank controlling fuel flow from said tank to said outlet, said shut-off valve comprising a first conduit extending from said outlet, an aperture defined by a deformed part of a wall of said first conduit communicating between said first conduit and said tank; a valve member carried by a deformed part of a further wall of said first conduit; said further wall comprising a wall defining a chamber and being movable relative to said aperture to effect movement of said valve member relative to said aperture, said further wall having an exposed area within the chamber greater than the area of said valve member exposed to the interior of said tank through said aperture, a pilot valve carried by said first conduit having an interior compartment with a first port in communication with said chamber, a second port in said pilot valve compartment communicating with said first conduit and a third port in said pilot valve compartment in communication with said tank, a piston slidably supported within said compartment for movement between alternate closing engagement at opposite ends with said second and third ports to control communication of said first port with each of said second and third ports, a float valve member supported within said tank connected to said piston for controlling movement of said piston between enclosing engagement with said second and third pilot valve ports, said pilot valve float member being movable between a first raised position by the liquid in the tank to close said third port and provide communication between said first and second ports and said chamber whereby tank pressures exerted over the exposed part of said valve member through said aperture is operative to urge said valve member away from said aperture, and a second position at a level beneath said first position for closing said second port and providing communication between said first and third ports whereby tank pressure occurring only over the valve member through said aperture and over said movable wall in said chamber is operative to urge said valve member toward said aperture.

4. The combination according to claim 3, wherein said valve member is biased toward said aperture.

References Cited in the file of this patent

UNITED STATES PATENTS

| 380,281 | Fyfe | Mar. 27, 1888 |
| 2,293,867 | Temple | Aug. 25, 1942 |

FOREIGN PATENTS

| 19,977 | Germany | Nov. 3, 1882 |